UNITED STATES PATENT OFFICE.

HEINRICH LAUBMANN, OF HÖCHST-ON-THE-MAIN, GERMANY, ASSIGNOR TO THE FARBWERKE, VORMALS MEISTER, LUCIUS & BRÜNING, OF SAME PLACE.

TETRAOXYANTHRAQUINONE DISULFONIC ACID AND PROCESS OF MAKING SAME.

SPECIFICATION forming part of Letters Patent No. 656,463, dated August 21, 1900.

Application filed April 12, 1898. Serial No. 677,346. (Specimens.)

*To all whom it may concern:*

Be it known that I, HEINRICH LAUBMANN, doctor of philosophy, a subject of the Emperor of Germany, residing at Höchst-on-the-Main, Germany, have invented certain new and useful Improvements in the Manufacture of Mordant Dyestuffs, Soluble in Water, from Anthraflavin and Isoanthraflavin Acids, of which the following is a specification.

Starting from the anthraflavin and isoanthraflavin acids, the two isomeric dioxyanthraquinones, I arrive by sulfonation and nitration at the two isomeric dinitrodisulfonic acids, the dinitroanthraflavin disulfonic acid and the dinitroisoanthraflavin disulfonic acid, which when reduced are transformed into the corresponding amidosulfonic acids. For treating these amidoöxyanthraquinonesulfonic acids in an acid, aqueous-alkaline, or neutral solution with gently-acting oxidizing agents the amido groups are easily eliminated and the result is two isomeric tetraoxyanthraquinonedisulfonic acids, which derive from two new isomeric tetraoxyanthraquinones.

I. *Manufacture of dinitroathraflavinndisulfonic acid or diamidoanthraflavindisulfonic acid.*—Ten parts, by weight, of anthraflavin acid are introduced into eighty to one hundred parts, by weight, of fuming sulfuric acid containing ten to twenty per cent. of $SO_3$ and heated until soluble in water, (110° to 120° centigrade.) It results therefrom the disulfonic acid of the anthraflavin acid. Without isolating the former and after cooling two molecules of nitric acid, preferably nitration acid, a mixture of concentrated sulfuric and nitric acid are slowly run in with stirring and cooling at the same time and finally heated for a short time to 40° to 60° centigrade in order to complete the nitration. The sulfonic-acid solution is poured into water, filtered, and salted out.

The dinitroanthraflavindisulfonic acid is characterized by good crystallizing potassium salts. If the raw acid be dissolved in a diluted solution of potassium carbonate, then from the yellow-red not too diluted solution is obtained with acetic acid the neutral potassium salt, crystallizing in splendid red needles, which in its anhydrous state has the constitution: $C_{14}H_2O_2(OKa)_2(SO_3Ka)_2(NO_2)_2$. If, however, the alkaline solution of the nitrosulfonic acid be acidified with mineral acids—such, for instance, as diluted hydrochloric or sulfuric acid—an acid potassium salt crystallizes out in orange-yellow needles, having in its anhydrous state the constitution: $C_{14}H_2O_2(OH)_2(SO_3Ka)_2(NO_2)_2$.

The dinitroanthraflavindisulfonic acid itself is easily soluble in water with a brown-yellow color, turning into green-yellow on addition of alkali. Warm concentrated sulfuric acid dissolves the sulfonic acid with a greenish-yellow color. A strong excess of acid precipitates it from the aqueous solution.

With regard to the transforming into diamidoanthraflavindisulfonic acid, the solution obtained in the manufacture of dinitrosulfonic acid is diluted in concentrated sulfuric acid with water, to which is slowly added, while gently heated, the calculated quantity of a solution of stannous chlorid or any other suitable reduction agent. The solution assumes after a short time an intense blue-red color, and the diamidoanthraflavindisulfonic acid is best isolated by salting out with chlorid of potassium.

The diamidoanthraflavindisulfonic acid is characterized by its acid potassium salt. The latter is obtained, if the raw acid above produced be taken up hot, in a diluted solution of potassium carbonate and acidified with acetic acid. It crystallizes in beautiful red needles, and in its anhydrous state has the constitution of $C_{14}H_2O_2(OH)_2(NH_2)_2(SO_3Ka)_2$. It is soluble in water with a red color, turning on addition of alkali into an intense blue-red. If concentrated sulfuric acid be poured on it, it turns gray in consequence of the formation of a sulfate soluble with difficulty. The sulfate is soluble, however, when gently warmed in sulfuric acid with an orange color.

II. *Manufacture of dinitroisoanthraflavindisulfonic acid and diamidoisoanthraflavindisulfonic acid.*—The manufacture of dinitroisoanthraflavindisulfonic acid is carried out in using isoanthraflavin acid exactly under the same experimental conditions as mentioned in the manufacture of dinitroanthraflavindisulfonic acid. By salting out the product of reaction dissolved in water with chlorid of potassium the acid potassium salt of the nitroisoanthraflavinsulfonic acid is obtained, which to be purified may be precipitated from its alkaline solution with mineral acids and recrystallized from water. It is thus obtained in light orange crystals, easily soluble in water (even cold) with an orange-yellow color, and having in their anhydrous state the constitution of $C_{14}H_2O_2(OH)_2(SO_2Ka)_2(NO_2)_2$. Alkalies turn its aqueous solution yellow-red on account of the formation of the neutral salt, which is less crystallizable.

The manufacture and isolation of the diamidoisoanthraflavindisulfonic acid is carried out exactly according to the example given in the manufacture of diamidoanthraflavindisulfonic acid. In order to purify, the raw salt obtained as above is transformed by precipitating its alkaline solution with acids into the acid salt of potassium, crystallizing in red crystals. The latter crystallizes less easily than the corresponding salt from anthraflavin acid and is soluble in hot water with a yellow-red color, turning on addition of alkalies into a beautiful blue-red. Warm concentrated sulfuric acid dissolves it with a light yellow color.

III. *The transforming of amidosulfonic acids into tetraoxyanthraquinonesulfonic acids.*—Of the various gently-acting oxidizing agents which cause, according to their specific mode of application in neutral, acid, or alkaline solution, the substitution of the amido by the hydroxyl groups, the following may be mentioned: peroxid of lead, peroxid of manganese, chlorid of lime, ferric salts, chromates, persulfates, nitric acid, &c. I illustrate my process by the following examples:

1. Diamidoanthraflavindisulfonic acid is dissolved in just the requisite quantity of hot water acidified, to which is added with good stirring a quantity corresponding to two to three molecules of peroxid of lead or peroxid of manganese, preferably in form of a fine paste. The intense red color of the diamidosulfonic acid when gently heated disappears almost suddenly, giving way to an orange-yellow one. This point being arrived at the reaction is completed. From the filtered solution chlorid of potassium or common salt separates the acid salt of the tetraoxyanthraquinonedisulfonic acid in form of a yellow-brown crystalline precipitate.

2. Diamidoanthraflavindisulfonic acid is dissolved in about twenty times the quantity of concentrated sulfuric acid, to which are introduced two molecules of finely-powdered peroxid of manganese while cooling. After a short time the solution assumes an olive color. The product of reaction is still stirred for some time at ordinary temperature and then poured into water. On being heated the olive-colored solution turns rapidly into the red-brown tint of the tetraoxysulfonic acid, which is isolated according to Example 1.

3. Ten parts, by weight, of diamidoanthraflavindisulfonic acid (acid salt of potassium) dissolved in hot acidified water, to which is added the calculated quantity of any ferric salt—for instance, ferric chlorid, ferric sulfate, or ferric cyanide of potassium. After boiling for a short time the solution is dyed brown-green and the formation of the tetraoxyanthraquinonedisulfonic acid, which can be isolated from the filtered solution by salting out, is completed. The product obtained, according to the examples given or by means of other above-mentioned oxidizing agents, is the acid potassium salt of a new tetraoxyanthraquinonedisulfonic acid, being pure in most cases. It is soluble with difficulty in cold, more easily in boiling water, with a reddish-yellow color, from which it crystallizes, if need be, on addition of a few drops of a solution of chlorid of potassium in red-brown crystals. Alkalies change it into the red neutral salt, which is precipitated by an excess of alkali from the aqueous solution in form of red crystalline laminæ. The tetraoxyanthraquinonedisulfonic acid from anthraflavin acid is a valuable mordant and acid dyestuff. Its acid color can be subsequently shaded with metallic salts. Treated with alum it produces blue-red shades; with fluorchrome pure violet ones, which are quite fast to milling and light.

4. If the diamidoisoanthraflavindisulfonic acid be boiled, as in example No. 3, in an acidified aqueous solution with the calculated quantity of a ferric salt (ferric chlorid, ferric sulfate, &c.,) until the solution is brown-green, the tetraoxyanthraquinonedisulfonic acid, isomeric with the one above mentioned, is easily isolated in form of its acid potassium salt, which may be easily obtained pure by recrystallization or by decomposition of the neutral salt.

5. To the slightly-acidified aqueous solution of diamidoisoanthraflavindisulfonic acid heated to 40° to 60° centigrade is introduced the calculated quantity of ammonium persulfate dissolved in a little water. After a short time the reaction is completed and the color of the solution, at first of an intense red, has changed into a yellow-orange one. The isolating of the tetraoxyanthraquinonedisulfonic acid is done by salting out. The acid potassium salt of this new tetraoxyanthraquinonedisulfonic acid from isoanthraflavin acid has on the whole the properties of its isomeric from diamidoanthraflavindisulfonic acid. It is easily soluble in hot water with a red-yellow color, from which it crystallizes on addition of a few drops of chlorid of potassium in light-brown needles. Alkalies change it in aqueous solution into the neutral salt, easily soluble with a violet color, which can only be precipitated in form of violet flakes by a great excess of alkali. In concentrated sulfuric acid the sulfonic acid is soluble with a fiery bluish-red color and weak light-green fluorescence. From a tinctorial point of view the product is the analogue of the isomeric tetraoxyanthraquinonedisulfonic acid from anthraflavin acid. The corresponding dyelakes are throughout of a somewhat more reddish tint than those of the latter.

Having now described my invention, what I claim is—

1. The herein-described process for the manufacture of a new tetraoxyanthraquinonedisulfonic acid from an anthraflavic acid, which consists in transforming an anthraflavic acid into disulfonic acid by means of fuming sulfuric acid, producing the dinitrodisulfonic acid by nitration of the disulfonic acid thus obtained, reducing the dinitrodisulfonic acid with reducing agents to diamidodisulfonic acid and transforming the diamidoanthraflavicdisulfonic acid into a tetraoxyanthraquinonedisulfonic acid by treatment with appropriate oxidizing agents, substantially as set forth.

2. As a new product, the tetraoxyanthraquinonedisulfonic acid derived from diamidoanthraflavicdisulfonic acid, in the form of its acid alkaline salt soluble in cold and more easily soluble in hot water with a red-yellow color, in the form of its neutral alkaline salt soluble in water with a red color, in concentrated sulfuric acid with a yellowish-red color, dyeing cotton in an acid bath yellowish-brown to orange-brown, and the acid dye of which may be shaded by treatment with metallic salts, whereby violet tints are produced upon applying chromium fluorid and red tints upon applying alum, substantially as set forth.

In testimony that I claim the foregoing as my invention I have signed my name in presence of two subscribing witnesses.

HEINRICH LAUBMANN.

Witnesses:
   HEINRICH HAHN,
   BERNHARD LEYDECKER.